(12) United States Patent
Roddy

(10) Patent No.: US 6,333,698 B1
(45) Date of Patent: Dec. 25, 2001

(54) EXPANDABLE MULTIPLE FREQUENCY PROGRAMMABLE TRANSMITTER

(75) Inventor: Timothy S. Roddy, Plymouth, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/188,978

(22) Filed: Nov. 10, 1998

(51) Int. Cl.[7] .................................................. G08C 19/00
(52) U.S. Cl. .................. 340/825.72; 455/107; 455/121; 455/129; 340/825.69; 341/176
(58) Field of Search ........................ 340/825.72, 825.71, 340/825.22, 825.69; 343/729, 906, 702; 341/176; 455/107, 121, 129

(56) References Cited

U.S. PATENT DOCUMENTS

| | | |
|---|---|---|
| 3,754,187 * | 8/1973 | Deming ................................. 325/37 |
| 5,109,222 | 4/1992 | Welty . |
| 5,442,340 | 8/1995 | Dykema . |
| 5,465,401 | 11/1995 | Thompson . |
| 5,479,155 | 12/1995 | Zeinstra et al. . |
| 5,583,485 | 12/1996 | Van Lente et al. . |
| 5,614,891 | 3/1997 | Zeinstra et al. . |
| 5,661,804 * | 8/1997 | Dykema et al. ........................ 380/21 |
| 5,726,645 | 3/1998 | Kamon et al. . |
| 5,774,065 * | 6/1998 | Mabuchi et al. ................. 340/825.72 |
| 5,815,557 * | 7/1998 | Larson ............................ 379/102.06 |

FOREIGN PATENT DOCUMENTS

| | | |
|---|---|---|
| 2083471 | 9/1994 | (CA) . |
| 0 697 491 | 2/1995 | (EP) . |

\* cited by examiner

*Primary Examiner*—Michael Horabik
*Assistant Examiner*—M Shimizu
(74) *Attorney, Agent, or Firm*—Brooks & Kushman P.C.

(57) ABSTRACT

A trainable transmitter includes code generation circuitry and a socket for receiving a plug-in module including circuitry for generating an RF signal. By selecting the appropriate plug-in module, the user can expand the frequency transmission range of the transmitter beyond that which may be pre-installed on the transmitter.

4 Claims, 3 Drawing Sheets

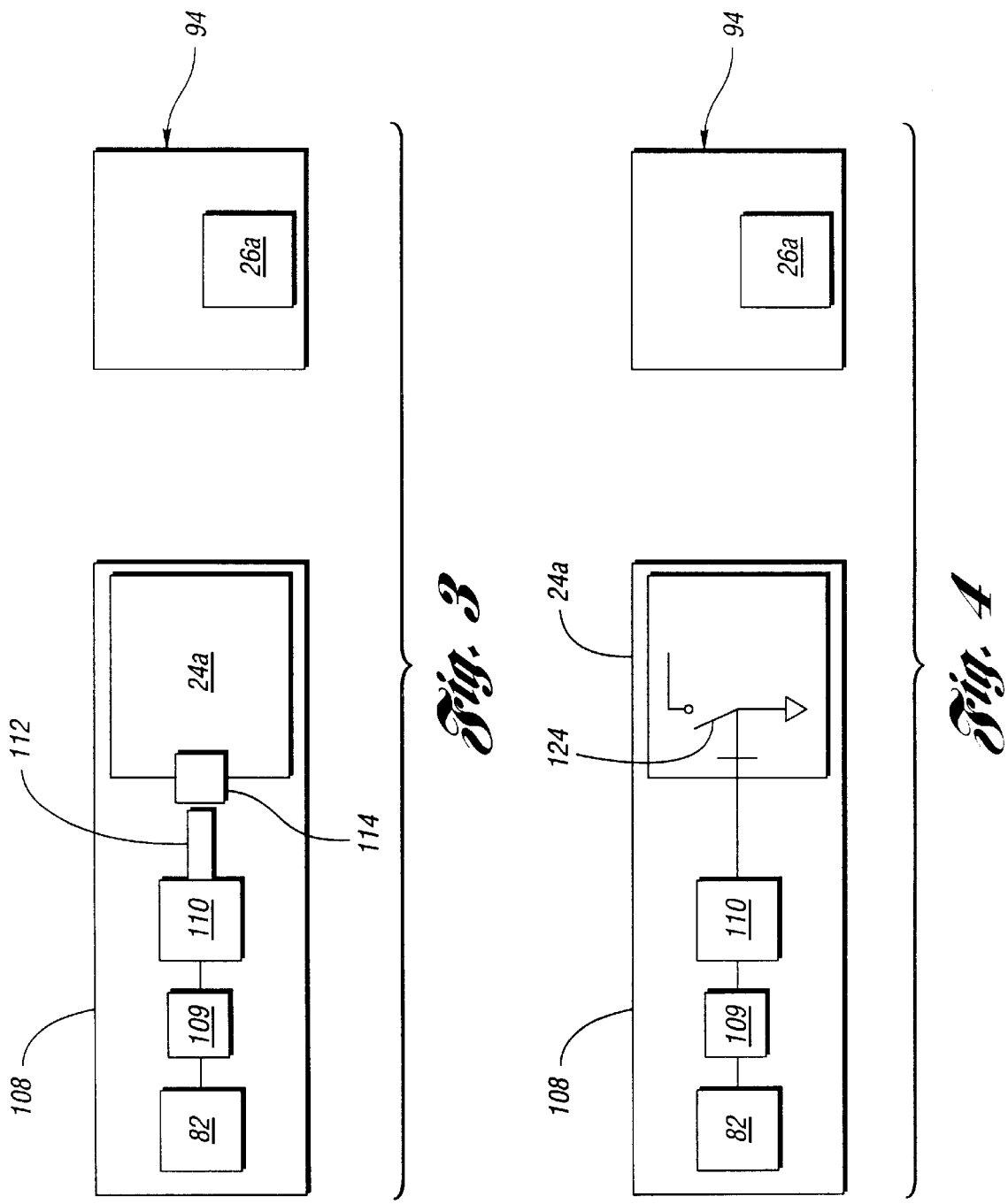

EXPANDABLE MULTIPLE FREQUENCY PROGRAMMABLE TRANSMITTER

BACKGROUND OF THE INVENTION

The present invention relates generally to wireless transmitters, particularly for vehicles.

Increasing numbers of new vehicles are being sold with trainable transmitters permanently installed in the vehicle. The trainable transmitters allow consumers to train the transmitter to duplicate an existing transmitter, such as a garage door opener. The current trainable transmitters pre-store a plurality of cryptographic algorithms allowing the trainable transmitter to be universal. This provides convenience to the consumer by allowing the trainable transmitter to be compatible with many home products, such as garage door openers.

The known universal trainable transmitter may not be capable of generating frequencies for all garage door openers or other home security systems. The transmitter may include a plurality of RF oscillators, each capable of generating an RF signal of a frequency associated with garage door openers or other home security systems. The transmitter may not include oscillators for generating the right frequencies of all home security systems. Further, security system manufacturers may begin using additional frequencies not originally provided in the trainable transmitter.

SUMMARY OF THE INVENTION

The present invention provides the ability to accommodate any frequency of an existing transmitter/receiver system in the trainable transmitter. A trainable transmitter according to the present invention includes a socket for receiving removable, replaceable plug-in modules which expand the frequency transmission capability of the transmitter. Preferably, the transmitter includes a socket into which the consumer can install a plug-in module which includes some of the electrical components for generating the RF signal at the new frequency. In this manner, if the trainable transmitter is initially unable to transmit the frequency of the user's receiver system, the user can obtain the correct plug-in module to connect to the trainable transmitter in order to expand the frequency transmission capability of the transmitter.

Alternatively, a repeater can be installed adjacent the receiver which receives a code at the new frequency. The repeater includes a receiver and code detection circuitry which is compatible with the trainable transmitter. The repeater also includes a transmitter which generates the code at the new frequency when the receiver and code detection circuitry in the repeater receive the correct signal from the trainable transmitter. Alternatively, the repeater can include the original transmitter from the transmitter/receiver system. The receiver and the repeater can be coupled either electrically or mechanically (i.e., the push button) to the original transmitter. In this manner, the transmitter can be utilized with any existing transmitter/receiver system, since the transmitter need not be capable of transmitting at the frequency or learning the encryption algorithm of the original transmitter/receiver system.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an alternate embodiment of the repeater shown in FIGS. 1 and 2.

DETAILED DESCRIPTION OF THE PREFERRED EMBODIMENTS

Figure 1:
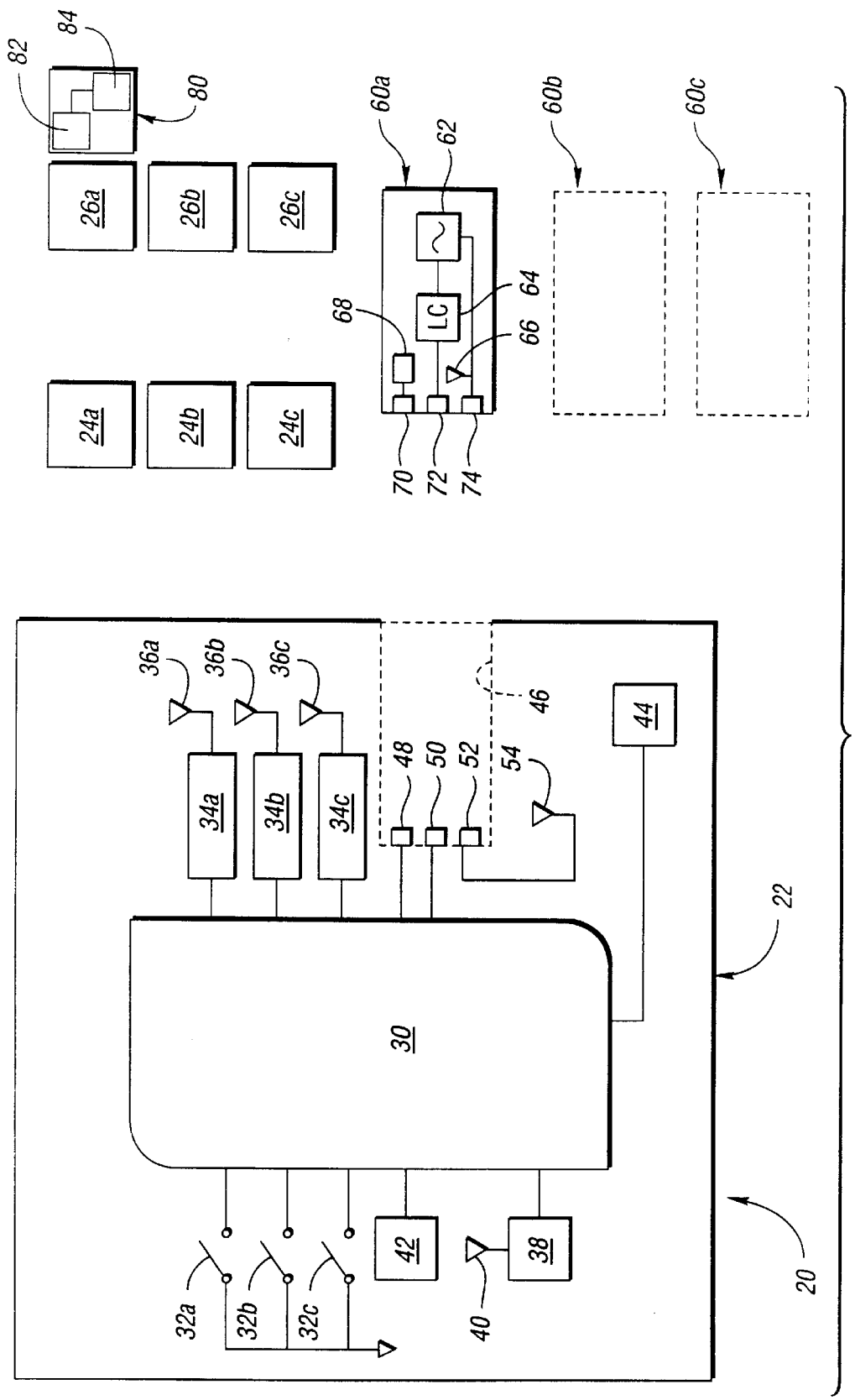
FIG. 1 is a schematic of the transmitter/receiver system of the present invention.

A schematic of the transmitter/receiver system 20 of the present invention is shown in FIG. 1 generally comprising a trainable transmitter 22 which can be used to replace original transmitters 24a–c, each associated with a receiver 26a–c, respectively. In a known manner, each of the transmitters 24 generates a digital code transmitted in an RF frequency. The code may be generated by code generation circuitry, including encryption algorithms also located on the respective receivers 26. Each of the transmitter 24 and receiver 26 pairs may have different RF frequencies, different modulation schemes and/or different encryption algorithms. Each of the receivers 26 may be associated with a different security system, such as a vehicle security system, garage door opener, home security system, etc.

The trainable transmitter 22 includes code generation circuitry, including a microprocessor 30. Microprocessor 30 includes software which performs the steps described herein. Microprocessor 30 receives inputs from a plurality of user input switches 32a–c. When programmed, each of the user input switches 32a–c would be associated with one of the receivers 26a–c, respectively. Fewer or more user input switches 32 could be utilized.

The microprocessor 30 selectively sends a digital code to one of a plurality of RF oscillators 34a–c, each having an appropriate antenna 36a–c. Each of the RF oscillators 34 generates a different RF frequency. Alternatively, each of the RF oscillators 34 could comprise a variable or voltage-controlled oscillator capable of generating a different range of RF frequencies.

The transmitter 22 includes an RF receiver 38 having an antenna 40. RF receiver 38 and antenna 40 are capable of receiving digital codes from the original transmitters 24a–c at any of a plurality of frequencies. The receiver 38 sends the digital code to the microprocessor 30 when the microprocessor 30 is in a learning mode. The microprocessor 30 includes a memory 42, comprising RAM or RAM and ROM, storing the encryption algorithms and data necessary to replace transmitters 24a–c, including frequency, algorithm, keys, modulations schemes, etc.

Techniques for receiving digital codes from original transmitters 24 and determining the correct encryption algorithm, frequency, modulation scheme, etc., are known in the art. Generally, the result of such techniques is that each of the user input switches 32a–c causes the microprocessor 30 to generate a code replacing original transmitters 24a–c, respectively. The microprocessor determines from memory 42 the next digital code to be generated and the frequency at which the code is to be generated. Upon determining the next digital code to be generated, the microprocessor 30 selects one of the RF transmitters 34a–c which would transmit the next digital code at the correct frequency associated with that user input switch 32a–c. It should be recognized that user input switch 32a would not necessarily be associated with RF oscillator 34a, and so on. Further, the trainable transmitter 22 can learn and re-learn in order to replicate different transmitters than transmitters 24a–c. Further, if more than one of the original transmitters 24 transmits at the same frequency, then one of the RF oscillators 34 could be associated with more than one of the user input switches 32. The number of RF oscillators 34*a–c* need not equal the number of user input switches 32*a–c*. The transmitter 22 further includes output indicators, such as LEDs 44, for communicating information, such as mode information, to the user.

The transmitter 22 includes a socket 46 including a plurality of electrical connectors 48, 50 and 52. Connectors 48 and 50 are electrically connected to the microprocessor 30. Connector 52 is connected to a first antenna portion 54 of a known length as will be described below.

The system 20 further includes a plurality of plug-in modules 60*a–c*, each including an oscillator, such as a surface acoustic wave, which may include or be associated with an LC circuit 64 which dictates the frequency of the oscillating signal from the oscillating circuit 62. An output of the oscillator (or oscillator and LC circuit 64) is connected to a second antenna portion 66. The plug-in module 60 may optionally include a ROM cartridge 68 which includes an additional encryption algorithm and data regarding modulation scheme, frequency, etc. The use of such a data module is described in co-pending patent application Ser. No. 09/140,022, entitled "Reconfigurable Universal Trainable Transmitter," which is hereby incorporated by reference. Electrical connectors or contacts 70, 72 and 74 on plug-in module 60 are electrically connected to the ROM module 68, LC circuit 64/oscillator 62 and second antenna portion 66, respectively.

The plug-in modules 60*a–c* are each selectively connectable to the socket 46 on transmitter 22. When a plug-in module 60 is connected to socket 46, connectors 70, 72 and 74 each make electrical contact with connectors 48, 50 and 52, respectively, in socket 46. At that time, microprocessor 30 can obtain the algorithms and other information from ROM module 68, if necessary. Microprocessor 30 would then generate the next digital code upon activation of the appropriate user-activated switch 32. The next digital code would be sent via connectors 50 and 72 to the LC circuit 64/oscillator 62 to be incorporated into the RF signal generated by oscillator 62 and LC circuit 64. The RF signal from the oscillator 62 carries the next digital code and transmits it via the antenna formed by the connection of first antenna portion 54 and second antenna portion 66, connected via connectors 52 and 74. Second antenna portion 66 is selected to have a length which, when added to first antenna portion 54, would be frequency-matched to the frequency generated by RF oscillator 62.

In operation, the trainable transmitter 22 learns the codes, algorithms and frequencies of transmitters 24, associates these codes, frequencies and algorithms with user input switches 32 and generates the appropriate next digital code upon activation of one of the user input switches 32. That digital code is then sent via one of the RF oscillators 34, depending upon which frequency is appropriate. If the oscillators 34 are unable to transmit the necessary frequency in order to duplicate one of the transmitters, for example, transmitter 24*a*, the user selects one of the plug-in modules 60*a, b* or *c* which has a frequency the same as transmitter 24*a*, for example, plug-in module 60*a*. The user connects plug-in module 60*a* into the socket 46 on transmitter 22. Then, when transmitter 30 needs to generate the next code for receiver 26*a*, it utilizes plug-in module 60*a* to generate the proper RF frequency for carrying the digital code. Thus, the trainable transmitter 22 of the present invention provides increased versatility for duplicating transmitters 24 of various frequencies.

In another aspect of the present invention, a repeater 80 includes a receiver 82 which includes encryption algorithms also located on transmitter 22 and utilized by microprocessor 30 to generate a next digital code. The receiver 82 also operates at a frequency associated with one of the built-in RF oscillators 34. The repeater 80 further includes a second transmitter 84 which generates the digital code received by receiver 82 and re-transmits that digital code at a different frequency, a frequency which matches that of transmitter 24*a*. The digital code at the appropriate frequency is received by receiver 26*a* for activation of that security system.

Figure 2:
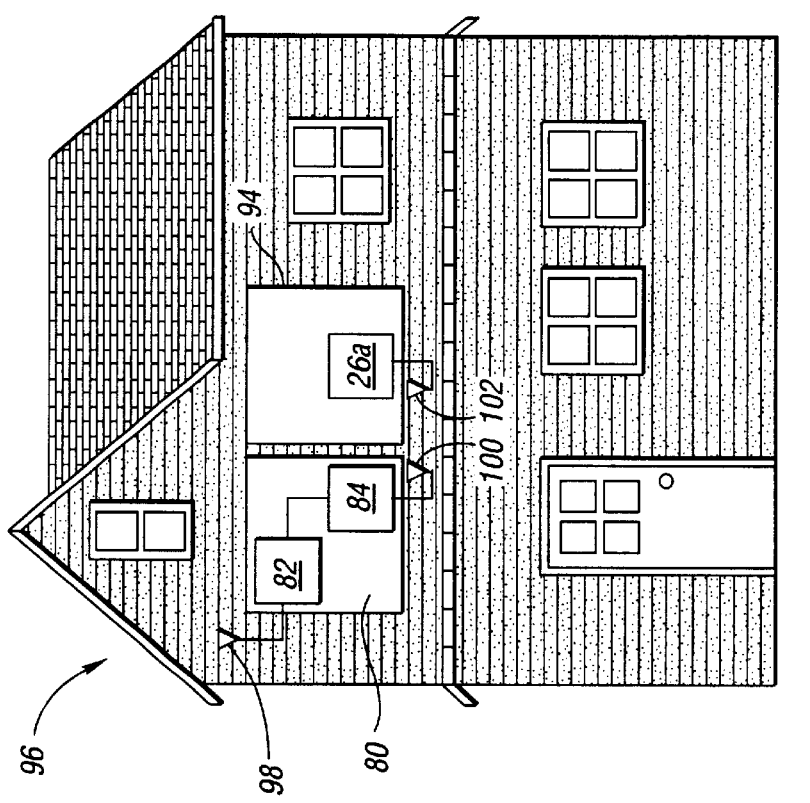
FIG. 2 illustrates the transmitter/receiver system of FIG. 1 installed in a vehicle and garage door opener system.
Figure 2:
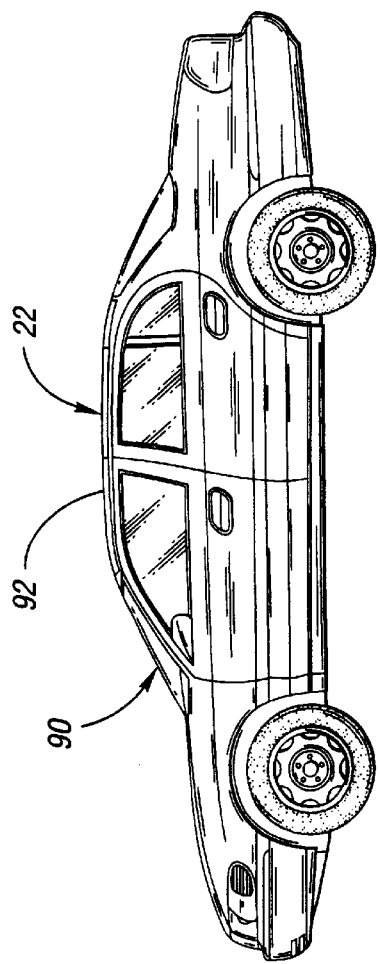

Referring to FIG. 2, the transmitter 22 is preferably installed in a vehicle 90, most preferably in the vehicle headliner 92. The transmitter 22 is programmed to operate a receiver 26*a*, associated with a security system, such as a garage door opener 92 in a garage 96. The repeater 80 is installed in the garage 96, preferably adjacent receiver 26*a*. The receiver 82 of the repeater 80 includes an antenna 98. The transmitter 84 of the repeater 80 includes an antenna 100 which is preferably positioned adjacent or directed toward an antenna 102 of receiver 26*a* on garage door opener 94.

In operation, the transmitter 22 installed in vehicle 90 transmits a digital code, preferably encrypted, which is received by antenna 98 and receiver 82. The digital code received by receiver 82 at its frequency is transmitted to transmitter 84, where it is re-transmitted at the frequency of receiver 26*a*. The digital code is analyzed by receiver 26*a* to determine if it is correct. If the code is correct, the receiver 26*a* activates garage door opener 94. In this manner also the frequency compatability of the universal transmitter can be expanded to include frequencies not originally provided by the built-in oscillators 34.

An alternate repeater 108 is shown schematically in FIG. 3. The repeater 108 includes the receiver 82 for receiving the digital code at the first frequency from the transmitter 22 (FIG. 2). The digital code is analyzed by code analyzer 109, which preferably includes a microprocessor which may include the same cryptographic algorithms as the transmitter 22. If the correct digital code is received, code analyzer 109 so indicates to an actuator 110 which mechanically activates, via a piston 112, a button 114 (or other user-activated switch) on original transmitter 24*a*, which is physically mounted in or adjacent the repeater 108. The original transmitter 24*a* is incorporated into and considered part of the repeater 108.

FIG. 4 illustrates another alternate embodiment of the repeater 118 wherein the receiver 82 and code analyzer 109 are directly electrically coupled to the original transmitter 24*a*. When the correct code is received by the receiver 82 and analyzer 109, an electrical actuator circuit 120 sends an electrical signal directly to a switch 124 within original transmitter 24*a*, causing transmitter 24*a* to generate the next code to be received by receiver 26*a*, at the proper frequency, for activating garage door opener 94. The original transmitter 24*a* is incorporated into and considered part of the repeater 108.

Although the examples have been given above with respect to activating garage door openers 94, other home security or vehicle security systems could also be utilized. Further, although the invention has been described with respect to RF transmitters, other transmitters, such as microwave, infrared, etc., could also be utilized. Further, the transmitter 22 could be provided with multiple sockets 46 for receiving different plug-in modules 60.

The transmitter 22 could determine the frequency by utilizing known frequency analysis techniques, or by transmitting the learned digital code at each of the frequencies from each of the RF oscillators 34, sequentially. When the user sees operation of the security system (such as the garage door opener opening or closing), the user presses one of the user-activated switches 32 again, thereby indicating to the microprocessor 30 that the correct frequency has been obtained. This technique is described more fully in co-pending U.S. patent application Ser. No. 09/027,323, entitled "Multiple-Frequency Programmable Transmitter," now U.S. Pat. No. 6,078,271 issued on Jun. 20, 2000, which is hereby incorporated by reference. The socket 46 is preferably accessible by the consumer or user, so that the consumer can install the appropriate plug-in module 60 with ease. If the transmitter 22 is a portable transmitter 22, such as a key fob, the socket 46 may be located within the battery compartment. If the transmitter 22 is installed in a vehicle 90, such as is shown in FIG. 2, the socket 46 is preferably located under a hinged, push-button bezel in the headliner 92.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wireless transmitter/receiver system comprising:

a remote transmitter selectively transmitting a first digital code at a first frequency; and a repeater having signal generation information arranged to replicate the output of an original transmitter associated with a particular receiver located remotely from the remote transmitter and the repeater, said repeater generating a second digital code at a second frequency based on the associated signal generation information in response to receiving said first code to replicate a code and output frequency signal suitable for receipt by the particular receiver, wherein the receiver activates a system in response to receiving the signal from the repeater;

wherein the signal generation information associated with a particular receiver is maintained in a separate transmitter unit, and said repeater comprises a receiver that is mechanically coupled to the separate transmitter unit to actuate the separate transmitter to generate the second code when the repeater receiver receives the first code;

wherein said remote transmitter includes first code generation circuitry including first encryption data, said first code changing upon sequential activations of the first transmitter, and said separate transmitter includes second code generation circuitry including a second encryption data different from said first encryption data, wherein said second code is also changed upon sequential activations of the separate transmitter.

2. The transmitter/receiver system of claim 1, wherein said repeater includes a receiver for receiving said first code at said first frequency.

3. The transmitter/receiver system of claim 1, wherein said first frequency is different from said second frequency.

4. The transmitter/receiver system of claim 3, wherein said first code is different from said second code.

* * * * *